United States Patent [19]

Aimi et al.

[11] Patent Number: 5,760,903
[45] Date of Patent: Jun. 2, 1998

[54] LIGHT MEASURING APPARATUS

[75] Inventors: Kei Aimi, Hirakata; Yasushi Mukai, Osaka, both of Japan

[73] Assignee: Matsushita Electric Industrial Co., Ltd., Osaka, Japan

[21] Appl. No.: 766,866

[22] Filed: Dec. 13, 1996

[30] Foreign Application Priority Data

Dec. 14, 1995 [JP] Japan ................... 7-347369

[51] Int. Cl.[6] ................................ G01B 9/02
[52] U.S. Cl. ................. 356/358; 356/349; 356/351
[58] Field of Search ......................... 356/345, 346, 356/357, 358, 351, 349

[56] References Cited

U.S. PATENT DOCUMENTS

| | | | |
|---|---|---|---|
| 5,341,205 | 8/1994 | McLandrich et al. | 356/358 |
| 5,633,712 | 5/1997 | Venkatesh et al. | 356/357 |

FOREIGN PATENT DOCUMENTS 6129812  5/1994  Japan .

Primary Examiner—Georgia Y. Epps
Assistant Examiner—Robert Kim
Attorney, Agent, or Firm—Watson Cole Stevens Davis, P.L.L.C.

[57] ABSTRACT

Inputs output beams of a laser that have been oscillation-frequency modulated by an injection current control by a power source into a beam splitter through a lens and an isolator, detects beams reflected from a first half-mirror and passing through a path, beams reflected from a second half-mirror and passing through a path, and beams reflected from an object to be measured and passing through a path, with a photodetector, detects a beat frequency signal according to an optical interference of the above-described three types of reflected beams with a frequency detector, and calculates a distance to the object to be measured from the three beat frequencies with a signal processing unit. Can measure the distance in high precision by erasing a change rate of the oscillation frequency modulation and speed of light and by eliminating an influence of fluctuations, based on information of the three frequencies. Also, includes means using a lens for carrying out reflection and transmission on both sides of the lens instead of using the first and second mirrors and includes means using a polarization splitter and a ¼ wave plate instead of using the beam splitter.

4 Claims, 3 Drawing Sheets

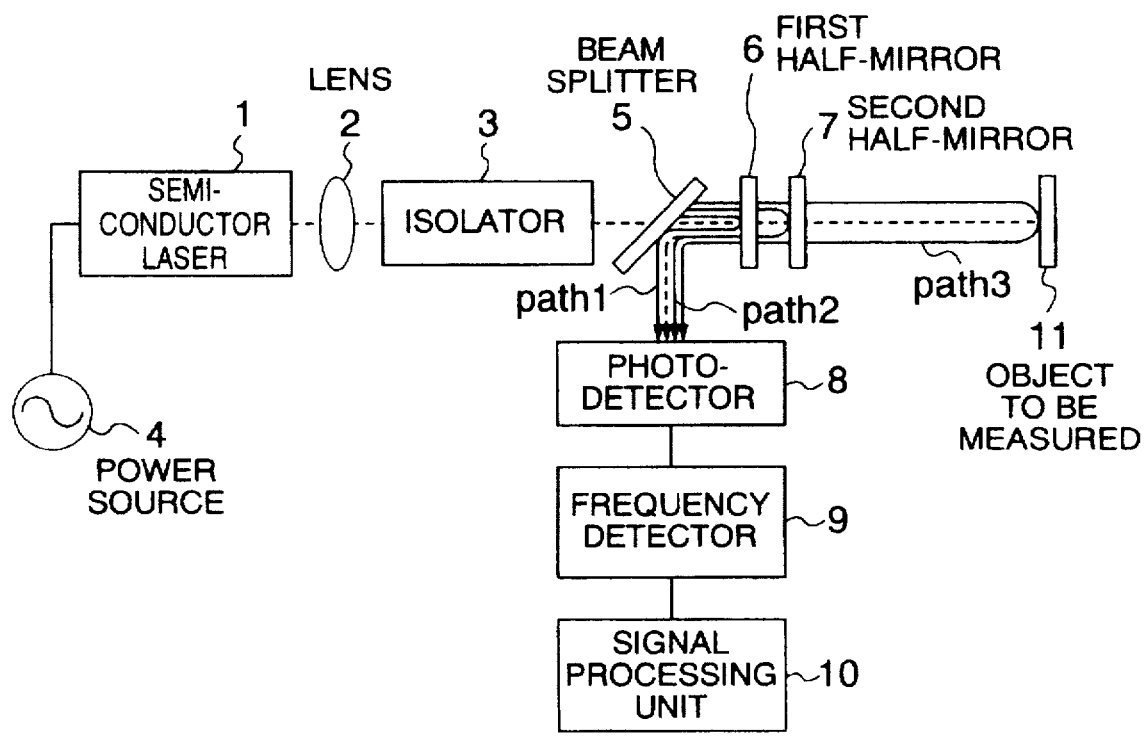
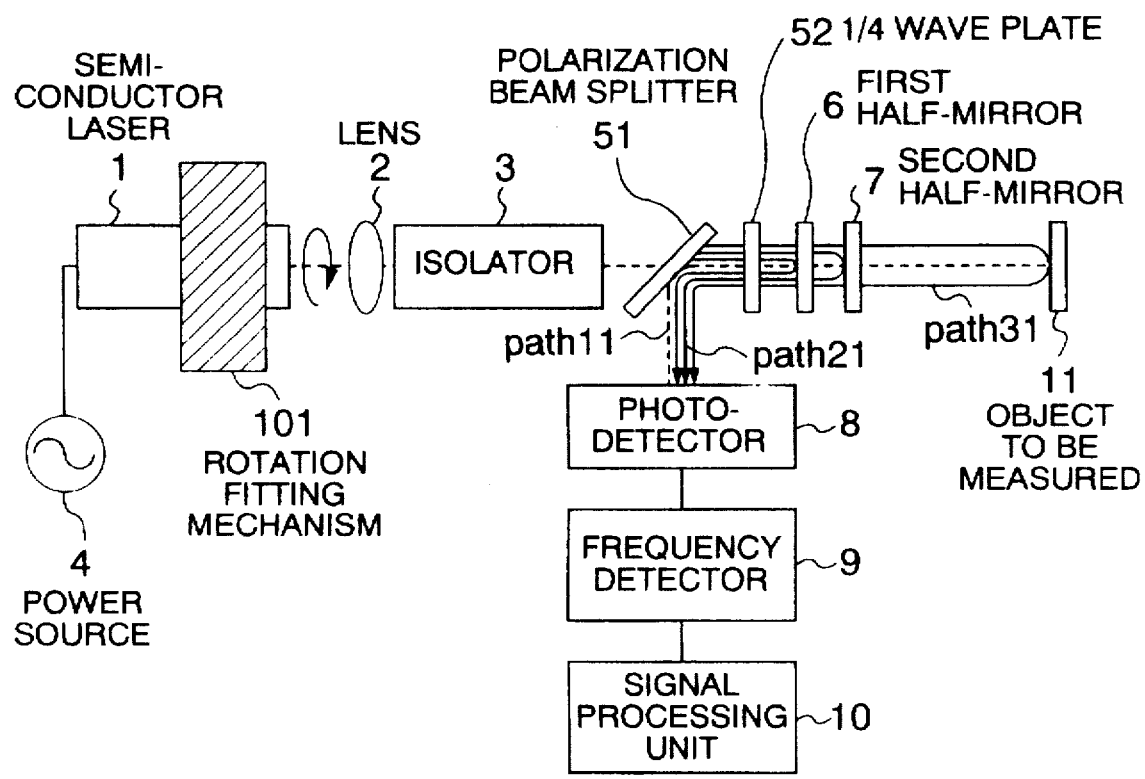

LIGHT MEASURING APPARATUS

BACKGROUND OF THE INVENTION

1. Field of the Invention

The present invention relates to a light measuring apparatus, and relates more particularly to a light measuring apparatus for measuring a distance to an object by utilizing laser beams and a measuring method therefor.

2. Description of the Prior Art

The conventional light measuring apparatus will be explained below with reference to drawings. A heterodyne interference method has so far been used as a light measuring apparatus for measuring a distance and a shape of an object in high precision and in non-contact by utilizing the coherence characteristics of laser beams. FIG. 3 is a schematic diagram for showing a structure of the conventional heterodyne interference measuring apparatus. In the drawing, 1 denotes a semiconductor laser, 2 a lens for converting an output light of the semiconductor laser 1 into parallel beams, 3 an isolator for interrupting a return light to the semiconductor laser 1, 4 a power source for driving the semiconductor laser 1, 5 a beam splitter for splitting the semiconductor laser beams into two parts, 8 a photodetector for detecting a luminous signal interfered by a reflected light of a mirror 16 and a reflected light of an object to be measured 11, 9 a frequency detector for detecting a beat frequency obtained from an interfered luminous signal, and 10 a signal processing unit for obtaining a distance to the object to be measured 11 from a beat frequency obtained.

The operation in the above-described structure will be explained below. FIG. 4 is a characteristic diagram for showing a current to be injected into the semiconductor laser 1 and an oscillation frequency in time lapse. As shown in the drawing, when the current injected into the semiconductor laser 1 is changed by the power source 4, the oscillation frequency of the semiconductor laser 1 changes corresponding to the injected current. Further, a luminous signal to be detected by the photodetector 8 is obtained as an interference light between a light reflected by the mirror 16 after passing through the beam splitter 5 from the semiconductor laser 1 and then guided to the photodetector 8 through the beam splitter 5 again and a light reflected by the object to be measured 11 after passing through the beam splitter 5 from the semiconductor laser 1 and then guided to the photodetector 8 through the beam splitter 5 again. In this case, when there is a difference L between the distances of the two light paths, a luminous signal I which is detected by the photodetector 8 is expressed as follows:

$$I = I1 + I2 + I1 * I2 * \cos((2\pi * df * L/C)t)$$

where C represents a light speed and df represents a change in frequency per unit time of an output light of the semiconductor laser.

In this case, I1 and I2 are DC components and therefore, the frequency to be detected by the frequency detector 9 becomes (df * L/C). Since df and C are either fixed or known values, it is possible to obtain the difference L between the distances of the two light paths from the value detected by the frequency detector 9.

However, there arises an error in the measured distance due to fluctuations in the oscillation wavelength of the semiconductor laser 1 and fluctuations of laser beams on the optical paths. As a method for solving this problem, there is means as disclosed in the Japanese Patent laid-open Publication No. JP-A-6-129812. FIG. 5 is a schematic diagram for showing the schematic structure of this means. In the drawing, a light emitted from a semiconductor laser 1 becomes parallel beams after passing through a lens 2 and the parallel beams are guided to an interferometer after passing through an isolator 3 which interrupts a return light. The guided beams are divided into two parts by a half-mirror 31, and the reflected beams are guided to an auxiliary optical system structured by a polarization beam splitter 51, a mirror 61, a mirror 62 and a half-mirror 71, and are incident to a photodetector 81 after passing through a path 301 and a path 401, so that the beams are detected as a luminous signal. On the other hand, the beams having passed through the half-mirror 31 are split into two parts by the polarization beam splitter 51, and beams reflected by an object to be measured 11 and beams reflected by a mirror 63 interfere each other and the interfered beams are guided to a photodetector 82. Since the structure of the auxiliary optical system is fixed, the luminous signal detected by the photodetector 81 changes due to the fluctuations in the oscillation wavelength of the semiconductor laser 1 and the fluctuations on the laser beams on the optical paths although a beat signal detected by the photodetector 81 is constant. The optical interferometer is structured to add a correction to the signal detected by the photodetector 82 by using the signal detected by the photodetector 81, thereby to correct errors attributable to the fluctuations of the semiconductor laser 1 and fluctuations of laser beams on the optical paths.

According to the light measuring apparatus of the prior-art technique, however, there is a problem in that approximately two times of optical elements are required as compared with those of the normal optical interferometer and that the system structure becomes larger as a whole than that of the normal optical interferometer since the auxiliary optical system is installed.

SUMMARY OF THE INVENTION

With a view to eliminating the above-described problems, it is an object of the present invention to provide a light measuring apparatus in a simple structure which can correct errors attributable to fluctuations of a semiconductor laser and fluctuations in laser beams on the optical paths and which can measure a distance to an object to be measured in high precision.

The present invention relating to claim 1 provides a light measuring apparatus which includes a semiconductor laser, a light source for driving the semiconductor laser, a lens for converting a light oscillated from the semiconductor laser into parallel beams, an isolator for passing the parallel beams as well as interrupting return beams, a beam splitter for splitting beams from the isolator, a first half-mirror for reflecting a part of beams from the beam splitter and passing remaining beams, a second half-mirror for reflecting a part of beams transmitted through the first half-mirror and transmitting remaining beams and irradiating the beams to an object to be measured, a photodetector for detecting beams reflected from the first half-mirror, beams reflected from the second half-mirror and beams reflected from the object to be measured through the beam splitter respectively, a frequency detector for detecting three beat frequency signals according to an optical interference of the three types of reflected beams from a signal detected by the photodetector, and a signal processing unit for processing frequency signals detected by the frequency detector, wherein the power source changes an oscillation frequency of the semiconductor laser at a predetermined change rate by controlling an injected current and the signal processing unit calculates a distance to the object to be measured based on the three beat frequencies.

With the above-described arrangement in a simple structure, it is possible to measure a distance to an object to be measured in high precision by eliminating an influence of fluctuations of the laser and on the optical path.

The present invention relating to claim 2 provides a light measuring apparatus which includes a semiconductor laser, a light source for driving the semiconductor laser, a first lens for converting a light oscillated from the semiconductor laser into parallel beams, an isolator for passing the parallel beams as well as interrupting return beams, a beam splitter for splitting beams from the isolator, a second lens for inputting beams from the beam splitter, reflecting and transmitting beams on both sides of the lens and irradiating transmitted beams to an object to be measured, a photodetector for detecting beams reflected from the first half-mirror, beams reflected from a plane of incidence of the second lens, beams reflected from a plane of exit of the second lens and beams reflected from the object to be measured through the beam splitter respectively, a frequency detector for detecting three beat frequency signals according to an optical interference of the three types of reflected beams from a signal detected by the photodetector, and a signal processing unit for processing frequency signals detected by the frequency detector, wherein the power source changes an oscillation frequency of the semiconductor laser at a predetermined change rate by controlling an injected current and the signal processing unit calculates a distance to the object to be measured based on the three beat frequencies.

With the above-described arrangement, it is possible to eliminate problems of the fitting precision of the first and second half-mirrors and measure a distance to an object to be measured in higher precision in a further simplified structure.

The present invention relating to claim 3 provides a light measuring apparatus which includes a semiconductor laser installed in a rotation fitting mechanism for rotating an optical axis on a center axis, a light source for driving the semiconductor laser, a lens for converting a light oscillated from the semiconductor laser into parallel beams, an isolator for passing the parallel beams as well as interrupting return beams, a polarization beam splitter for polarizingly splitting beams from the isolator, a ¼ wave plate for converting transmission beams of the polarization beam splitter into a circularly polarized wave and outputting the beams, a first half-mirror for reflecting a part of output beams from the ¼ wave plate and transmitting remaining beams, a second half-mirror for reflecting a part of beams transmitted through the first half-mirror and transmitting remaining beams and irradiating the beams to an object to be measured, a photodetector for detecting beams reflected from the first half-mirror, beams reflected from the second half-mirror and beams reflected from the object to be measured through the ¼ wave plate and the polarization beam splitter respectively, a frequency detector for detecting three beat frequency signals according to an optical interference of the three types of reflected beams from a signal detected by the photodetector, and a signal processing unit for processing frequency signals detected by the frequency detector, wherein the power source changes an oscillation frequency of the semiconductor laser at a predetermined change rate by controlling an injected current and the signal processing unit calculates a distance to the object to be measured based on the three beat frequencies.

With the above-described arrangement, it is possible to make smaller the loss of beams than that according to the normal beam splitter and can realize the effect of the means relating to claim 1 with higher S/N ratio.

The present invention relating to claim 4 provides a light measuring apparatus which includes a semiconductor laser installed in a rotation fitting mechanism for rotating an optical axis on a center axis, a light source for driving the semiconductor laser, a lens for converting a light oscillated from the semiconductor laser into parallel beams, an isolator for passing the parallel beams as well as interrupting return beams, a polarization beam splitter for polarizingly splitting beams from the isolator, a ¼ wave plate for converting transmission beams of the polarization beam splitter into a circularly polarized wave and outputting the beams, a second lens for inputting output beams from the ¼ wave plate, reflecting and transmitting beams on both sides of the lens and irradiating transmitted beams to an object to be measured, a photodetector for detecting beams reflected from a plane of incidence of the second lens, beams reflected from a plane of exit of the second lens and beams reflected from the object to be measured through the ¼ wave plate and the beam splitter respectively, a frequency detector for detecting three beat frequency signals according to an optical interference of the three types of reflected beams from a signal detected by the photodetector, and a signal processing unit for processing frequency signals detected by the frequency detector, wherein the power source changes an oscillation frequency of the semiconductor laser at a predetermined change rate by controlling an injected current and the signal processing unit calculates a distance to the object to be measured based on the three beat frequencies.

With the above-described arrangement, it is possible to make smaller the loss of beams than that according to the normal beam splitter and can realize the effect of the means relating to claim 2 with higher S/N ratio.

The present invention described in claim 1 provides a light measuring apparatus which includes a semiconductor laser, a light source for driving the semiconductor laser, a lens for converting a light oscillated from the semiconductor laser into parallel beams, an isolator for passing the parallel beams as well as interrupting return beams, a beam splitter for splitting beams from the isolator, a first half-mirror for reflecting a part of beams from the beam splitter and passing remaining beams, a second half-mirror for reflecting a part of beams transmitted through the first half-mirror and transmitting remaining beams and irradiating the beams to an object to be measured, a photodetector for detecting beams reflected from the first half-mirror, beams reflected from the second half-mirror and beams reflected from the object to be measured through the beam splitter respectively, a frequency detector for detecting three beat frequency signals according to an optical interference of the three types of reflected beams from a signal detected by the photodetector, and a signal processing unit for processing frequency signals detected by the frequency detector, wherein the power source changes an oscillation frequency of the semiconductor laser at a predetermined change rate by controlling an injected current and the signal processing unit calculates a distance to the object to be measured based on the three beat frequencies, further, the present invention described in claim 2 provides a light measuring apparatus which includes a semiconductor laser, a light source for driving the semiconductor laser, a first lens for converting a light oscillated from the semiconductor laser into parallel beams, an isolator for passing the parallel beams as well as interrupting return beams, a beam splitter for splitting beams from the isolator, a second lens for inputting beams from the beam splitter, reflecting and transmitting beams on both sides of the lens and irradiating transmitted beams to an object to be measured, a photodetector for detecting beams reflected from the first half-mirror, beams reflected from a plane of incidence of the second lens, beams reflected from a plane of exit of the second lens and beams reflected from the object to be measured through the beam splitter respectively, a frequency detector for detecting three beat frequency signals according to an optical interference of the three types of reflected beams from a signal detected by the photodetector, and a signal processing unit for processing frequency signals detected by the frequency detector, wherein the power source changes an oscillation frequency of the semiconductor laser at a predetermined change rate by controlling an injected current and the signal processing unit calculates a distance to the object to be measured based on the three beat frequencies, further, the present invention described in claim 3 provides a light measuring apparatus which includes a semiconductor laser installed in a rotation fitting mechanism for rotating an optical axis on a center axis, a light source for driving the semiconductor laser, a lens for converting a light oscillated from the semiconductor laser into parallel beams, an isolator for passing the parallel beams as well as interrupting return beams, a polarization beam splitter for polarizingly splitting beams from the isolator, a ¼ wave plate for converting transmission beams of the polarization beam splitter into a circularly polarized wave and outputting the beams, a first half-mirror for reflecting a part of output beams from the ¼ wave plate and transmitting remaining beams, a second half-mirror for reflecting a part of beams transmitted through the first half-mirror and transmitting remaining beams and irradiating the beams to an object to be measured, a photodetector for detecting beams reflected from the first half-mirror, beams reflected from the second half-mirror and beams reflected from the object to be measured through the ¼ wave plate and the polarization beam splitter respectively, a frequency detector for detecting three beat frequency signals according to an optical interference of the three types of reflected beams from a signal detected by the photodetector, and a signal processing unit for processing frequency signals detected by the frequency detector, wherein the power source changes an oscillation frequency of the semiconductor laser at a predetermined change rate by controlling an injected current and the signal processing unit calculates a distance to the object to be measured based on the three beat frequencies, and the present invention described in claim 4 provides a light measuring apparatus which includes a semiconductor laser installed in a rotation fitting mechanism for rotating an optical axis on a center axis, a light source for driving the semiconductor laser, a lens for converting a light oscillated from the semiconductor laser into parallel beams, an isolator for passing the parallel beams as well as interrupting return beams, a polarization beam splitter for polarizingly splitting beams from the isolator, a ¼ wave plate for converting transmission beams of the polarization beam splitter into a circularly polarized wave and outputting the beams, a second lens for inputting output beams from the ¼ wave plate, reflecting and transmitting beams on both sides of the lens and irradiating transmitted beams to an object to be measured, a photodetector for detecting beams reflected from a plane of incidence of the second lens, beams reflected from a plane of exit of the second lens and beams reflected from the object to be measured through the ¼ wave plate and the beam splitter respectively, a frequency detector for detecting three beat frequency signals according to an optical interference of the three types of reflected beams from a signal detected by the photodetector, and a signal processing unit for processing frequency signals detected by the frequency detector, wherein the power source changes an oscillation frequency of the semiconductor laser at a predetermined change rate by controlling an injected current and the signal processing unit calculates a distance to the object to be measured based on the three beat frequencies.

BRIEF DESCRIPTION OF THE DRAWINGS

FIG. 1 is a schematic diagram for showing the structure of the light measuring apparatus according to a first embodiment of the present invention.

FIG. 2 is a schematic diagram for showing the structure of the light measuring apparatus according to a second embodiment of the present invention.

DESCRIPTION OF THE PREFERRED EMBODIMENTS

Figure 3:
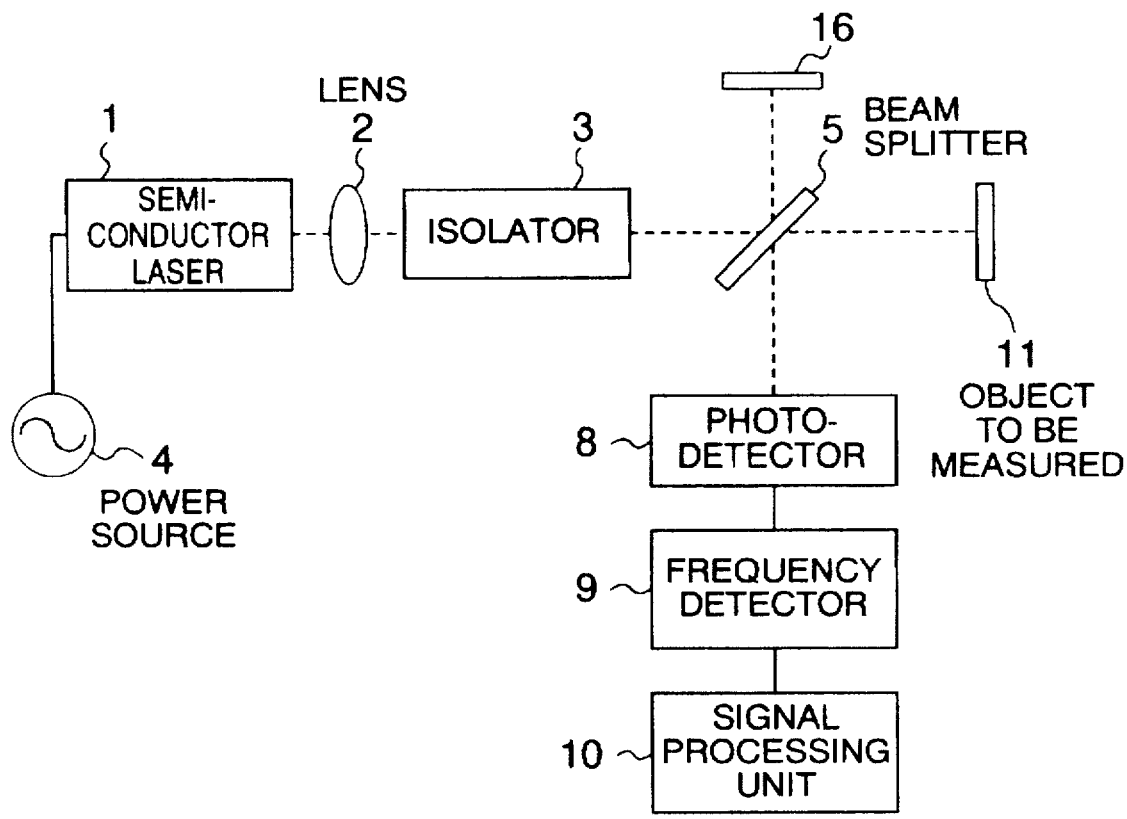
FIG. 3 is a schematic diagram for showing the structure of the conventional light measuring apparatus.

Embodiments of the present invention will be explained below.

A first embodiment of the light measuring apparatus according to the present invention will be explained with reference to the drawings. The first embodiment relates to claim 1 and claim 2.

FIG. 1 is a schematic diagram for showing the structure of the first embodiment. In the drawing, 1 denotes a semiconductor laser (hereinafter to be simply referred to as a laser), 2 a lens for converting an oscillation light of the laser 1 into parallel beams, 3 an isolator for interrupting return beams to the laser 1, 4 a power source for the laser, 5 a beam splitter, 6 a first half-mirror, 7 a second half-mirror, 8 a photodetector, 9 a frequency detector, 10 a signal processing unit and 11 an object to be measured.

The operation of the above-described structure will be explained next. An oscillation light from the laser 1 is converted into parallel beams by the lens 2, and the parallel beams are guided to an interferometer main body through the isolator 3. In this case, the isolator plays a role of securing a stable light emitting source by preventing such a phenomenon that the oscillation of the laser 1 becomes unstable by return beams. The beams guided to the beam splitter 5 are split into two parts, one part being guided to the half-mirror 6 and the rest being discharged outside the interferometer. When the laser beams pass the half-mirror 6, part of the beams are reflected by the half-mirror and are split into two parts again by the beam splitter 5, the beams of one part being guided to the photodetector 8 through a path 1 and the beams of the other part being absorbed by the isolator 3. When the beams having passed the half-mirror 6 pass the half-mirror 7, part of the beams are reflected and guided to the photodetector 8 through a path 2 formed by the half-mirror 6 and the beam splitter 5. Beams having passed the half-mirror 7 are reflected by the object to be measured 11 and part of the reflected beams are guided to the photodetector 8 through a path 3 formed by the half-mirror 7, the half-mirror 6 and the beam splitter 5. Beams having passed the path 1, the path 2 and the path 3 interfere with each other on the photodetector 8 and are observed as an optical interference signal by the photodetector 8.

Figure 4:
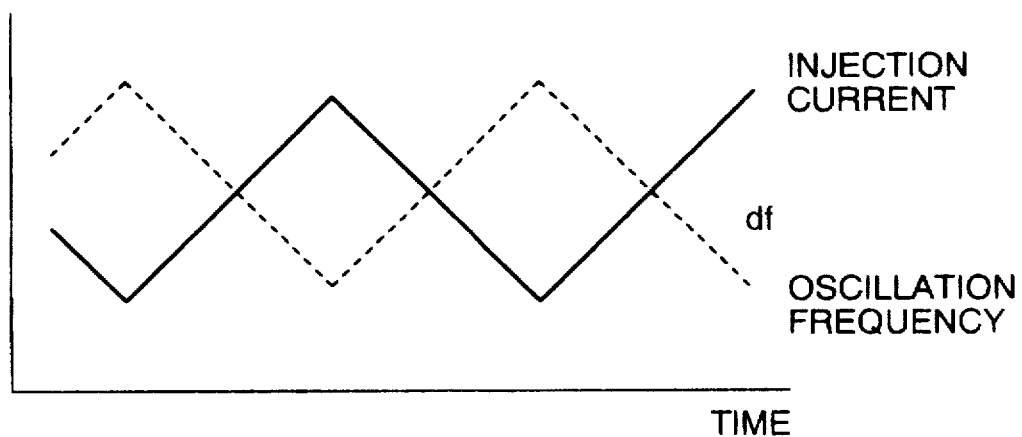
FIG. 4 is a characteristic diagram for showing the injection current of the semiconductor laser and the oscillation frequency.
Figure 5:
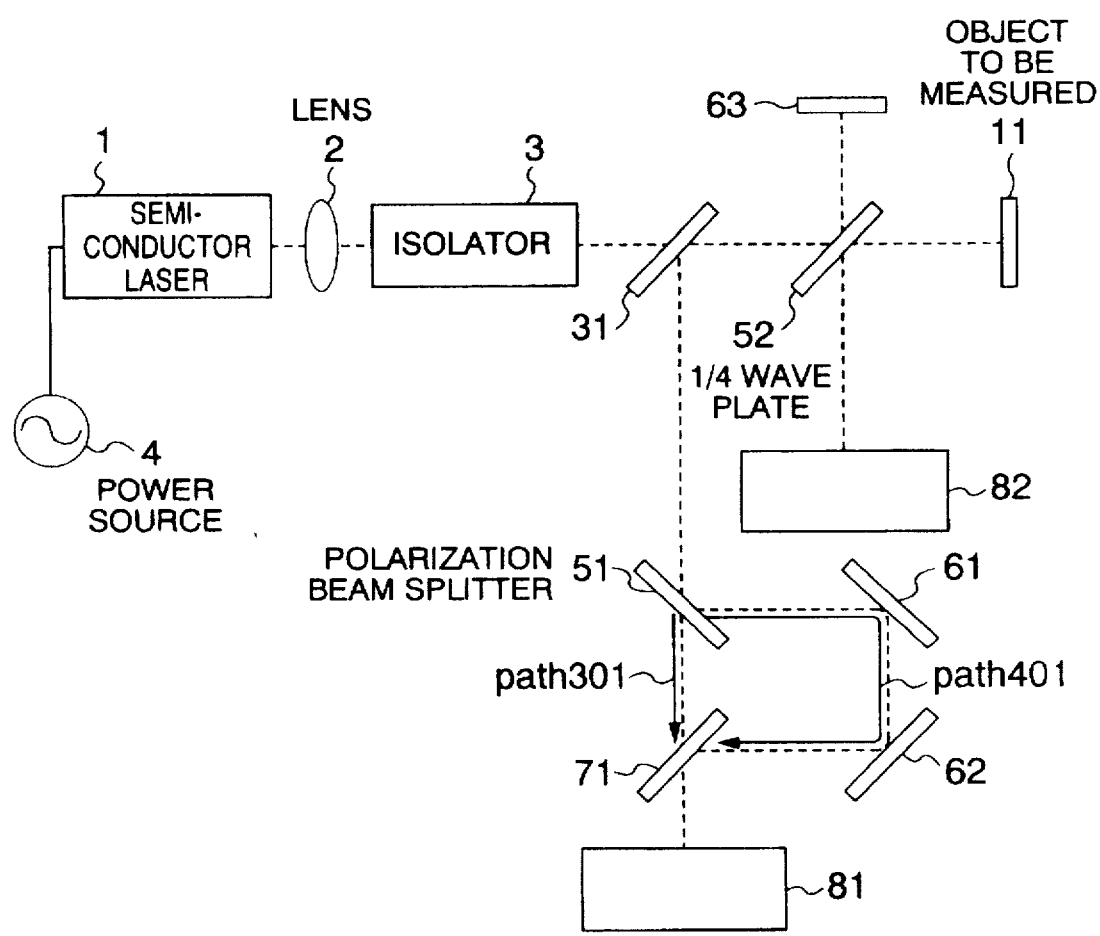
FIG. 5 is a schematic diagram for showing other structure of the conventional light measuring apparatus.

The injection current from the laser 1 is changed into a triangular wave shape by the power source 4 and the frequency of the oscillation beams from the laser 1 changes similarly, as shown in FIG. 4. In the drawing, df represents the slope of the changes of the oscillation frequency of the laser 1. In this case, the photodetector 8 can not actually catch faithfully the changes of the signal in the oscillation frequency area of the beams but detects the signal as a DC component. Assume that optical path lengths of the path 1, the path 2 and the path 3 are expressed as L1, L2 and L3 respectively and the speed of light is expressed as C. When the beams on the path 3 are set as a basis, the beams on the path 2 have a time delay of (L3−L2)/C from the beams on the path 3 and similarly the beams on the path 1 have a time delay of (L3−L1)/C from the beams on the path 3. Then, the beams on the path 1 and the beams on the path 2, the beams on the path 2 and the beams on the path 3, and the beams on the path 1 and the beams on the path 3 interfere with each other respectively, and these interference beams are detected as an optical signal by the photodetector 8.

Accordingly, a signal S detected by the photodetector 8 is a beat signal generated by the differences of the frequencies of the beams on the path 1, the path 2 and the path 3, which is expressed as follows.

$$S = a * sin\{2\pi(df * (L3-L1)/C) * t\} + b * sin\{2\pi(df * (L3-L2)/C) * t\} + c * sin\{2\pi(df * (L2-L1)/C) * t\} + D$$

where, a, b and c represent values to be determined by structure conditions of the interferometer, and D represents a value of the beams that can not be measured as waves by the photodetector and thus detected as a DC component. The frequency detector 9 detects the respective frequency values from the signal S as the following three frequency components.

$$f1 = df * (L3-L1)/C$$

$$f2 = df * (L3-L2)/C$$

$$f3 = df * (L2-L1)/C$$

In the structure of the interferometer, only the object to be measured 11 has not a fixed position, and the values of L1 and L2 become fixed values. Therefore, the distance L3 to be measured is expressed as follows.

$$(L3-L1) = (L2-L1) * f1/f3$$

Since the term df which varies due to the fluctuations of the laser 1 is not included in this expression and also since all the beams pass the path 3 and use the common path, it is possible to offset the term of the speed of light C which varies due to changes in the temperature on the optical paths of the interferometer. As a result, it becomes possible for the signal processing unit 10 to correct errors attributable to the above-described causes and measure a distance to the object to be measured in high precision.

Further, when a lens which causes the beams to reflect and transmit on both sides of the lens is used instead of the half-mirror 6 and the half-mirror 7, it is also possible to measure a distance to the object to be measured by a similar method. Additionally, since both sides of the lens play a role of the two half-mirrors, an error in the relative fitting of the half-mirror 6 and the half-mirror 7 can be avoided and also a fitting error of the (L2−L1) can be avoided in the measuring of a distance (L3−L1) to the object to be measured 11, so that the distance can be measured in higher precision.

Next, a second embodiment of the light measuring apparatus according to the present invention will be explained with reference to the drawings. The second embodiment relates to claim 3 and claim 4.

FIG. 2 is a schematic diagram for showing the structure of the second embodiment. The structural elements which are the same as those in FIG. 1 are attached with the same numbers and their explanation will be omitted. In the drawing, 101 denotes a rotation fitting mechanism for rotatably fixing the laser 1 around the optical axis, 51 a polarization beam splitter and 52 a ¼ wave plate. The polarization beam splitter 51 has characteristics that it transmits P waves of linear polarized beams and reflects S waves. Accordingly, the rotation fitting mechanism 101 positions the laser 1 by rotating the laser so that the P waves are guided the most to the interferometer.

The operation of the above-described structure will be explained below. In this case, description will be made by assuming an ideal case where all the oscillation beams from the laser 1 become P waves. All the beams emitted from the laser 1 pass the polarization beam splitter 51, then pass the ¼ wave plate 52 and become circularly polarized waves. The circularly polarized beams pass the route of a path 11, a path 21 and a path 31 and pass again the ¼ wave plate 52. The circularly polarized beams become S waves, which are then incident to the polarization beam splitter 51. The incident beams are reflected by the polarization beam splitter 51 and guided to the photodetector 8. The optical waves on the path 11, the path 21 and the path 31 interfere with each other and they are observed as a sum of signals of beat frequency components that are the differences of the respective frequencies.

In this case, it is clear that since the beams are not split into two parts by the polarization beam splitter 51 but almost all the beams are used for the interference, the S/N ratio is improved significantly as compared with the case where the normal beam splitter is used. Even when all the beams do not become P waves, it is possible to make the ratio of the P waves to be 50% or above by the rotation fitting mechanism 101 since the beams emitted by the laser 1 are linearly polarized optical waves. Accordingly, the ratio of the beams used for the interferometer becomes larger, without fail, than the ratio obtained in the case where the beam splitter for splitting the beams into two parts is used. Thus, it is apparent that the S/N ratio of the interference signal will improve significantly.

Further, it is needless to mention that when all the beams become P waves, the isolator 3 is not necessary because all the reflected beams are reflected by the polarization beam splitter 51 and there is no return beam to the laser 1.

As is clear from the above explanation, a half-mirror or a lens for reflecting and transmitting beams on both sides of the lens is used according to the present invention, so that it is possible to correct errors attributable to fluctuations in the laser and fluctuations of beams on the optical paths and it is also possible to measure a distance to an object to be measured in high precision, in a simple structure. Thus, the present invention can provide a high-precision light measuring apparatus in more compact and at lower cost than the light measuring apparatus according to the prior art technique.

What is claimed is:

1. A light measuring apparatus, comprising:
 a semiconductor laser;

a light source for driving said semiconductor laser;

a lens for converting a light oscillated from said semiconductor laser into parallel beams;

an isolator for passing said parallel beams as well as interrupting return beams;

a beam splitter for splitting beams from said isolator;

a first half-mirror for reflecting a part of beams from said beam splitter and passing remaining beams;

a second half-mirror for reflecting a part of beams transmitted through said first half-mirror and transmitting remaining beams and irradiating said beams to an object to be measured;

a photodetector for detecting beams reflected from said first half-mirror, beams reflected from said second half-mirror and beams reflected from said object to be measured through said beam splitter respectively;

a frequency detector for detecting three beat frequency signals according to an optical interference of said three types of reflected beams from a signal detected by said photodetector; and signal processing means for processing frequency signals detected by said frequency detector, wherein said power source changes an oscillation frequency of said semiconductor laser at a predetermined change rate by controlling an injected current and said signal processing means calculates a distance to said object to be measured based on said three beat frequencies.

2. A light measuring apparatus, comprising:

a semiconductor laser;

a light source for driving said semiconductor laser;

a first lens for converting a light oscillated from said semiconductor laser into parallel beams;

an isolator for passing said parallel beams as well as interrupting return beams;

a beam splitter for splitting beams from said isolator;

a second lens for inputting beams from said beam splitter, reflecting and transmitting beams on both sides of said lens and irradiating transmitted beams to an object to be measured;

a photodetector for detecting beams reflected from said first half-mirror, beams reflected from a plane of incidence of said second lens, beams reflected from a plane of exit of said second lens and beams reflected from said object to be measured through said beam splitter respectively;

a frequency detector for detecting three beat frequency signals according to an optical interference of said three types of reflected beams from a signal detected by said photodetector; and signal processing means for processing frequency signals detected by said frequency detector, wherein said power source changes an oscillation frequency of said semiconductor laser at a predetermined change rate by controlling an injected current and said signal processing means calculates a distance to said object to be measured based on said three beat frequencies.

3. A light measuring apparatus, comprising:

a semiconductor laser installed in a rotation fitting mechanism for rotating an optical axis on a center axis;

a light source for driving said semiconductor laser;

a lens for converting a light oscillated from said semiconductor laser into parallel beams;

an isolator for passing said parallel beams as well as interrupting return beams;

a polarization beam splitter for polarizingly splitting beams from said isolator;

a ¼ wave plate for converting transmission beams of said polarization beam splitter into a circularly polarized wave and outputting said beams;

a first half-mirror for reflecting a part of output beams from said ¼ wave plate and transmitting remaining beams; a second half-mirror for reflecting a part of beams transmitted through said first half-mirror and transmitting remaining beams and irradiating said beams to an object to be measured;

a photodetector for detecting beams reflected from said first half-mirror, beams reflected from said second half-mirror and beams reflected from said object to be measured through said ¼ wave plate and said polarization beam splitter respectively;

a frequency detector for detecting three beat frequency signals according to an optical interference of said three types of reflected beams from a signal detected by said photodetector; and signal processing means for processing frequency signals detected by said frequency detector, wherein said power source changes an oscillation frequency of said semiconductor laser at a predetermined change rate by controlling an injected current and said signal processing means calculates a distance to said object to be measured based on said three beat frequencies.

4. A light measuring apparatus, comprising:

a semiconductor laser installed in a rotation fitting mechanism for rotating an optical axis on a center axis;

a light source for driving said semiconductor laser;

a lens for converting a light oscillated from said semiconductor laser into parallel beams;

an isolator for passing said parallel beams as well as interrupting return beams;

a polarization beam splitter for polarizingly splitting beams from said isolator;

a ¼ wave plate for converting transmission beams of said polarization beam splitter into a circularly polarized wave and outputting said beams;

a second lens for inputting output beams from said ¼ wave plate, reflecting and transmitting beams on both sides of said lens and irradiating transmitted beams to an object to be measured;

a photodetector for detecting beams reflected from a plane of incidence of said second lens, beams reflected from a plane of exit of said second lens and beams reflected from said object to be measured through said ¼ wave plate and said beam splitter respectively;

a frequency detector for detecting three beat frequency signals according to an optical interference of said three types of reflected beams from a signal detected by said photodetector; and signal processing means for processing frequency signals detected by said frequency detector, wherein said power source changes an oscillation frequency of said semiconductor laser at a predetermined change rate by controlling an injected current and said signal processing means calculates a distance to said object to be measured based on said three beat frequencies.

* * * * *